A. V. HINMAN.
MILKING MACHINE.
APPLICATION FILED APR. 16, 1915.
1,233,668.
Patented July 17, 1917.
2 SHEETS—SHEET 1.
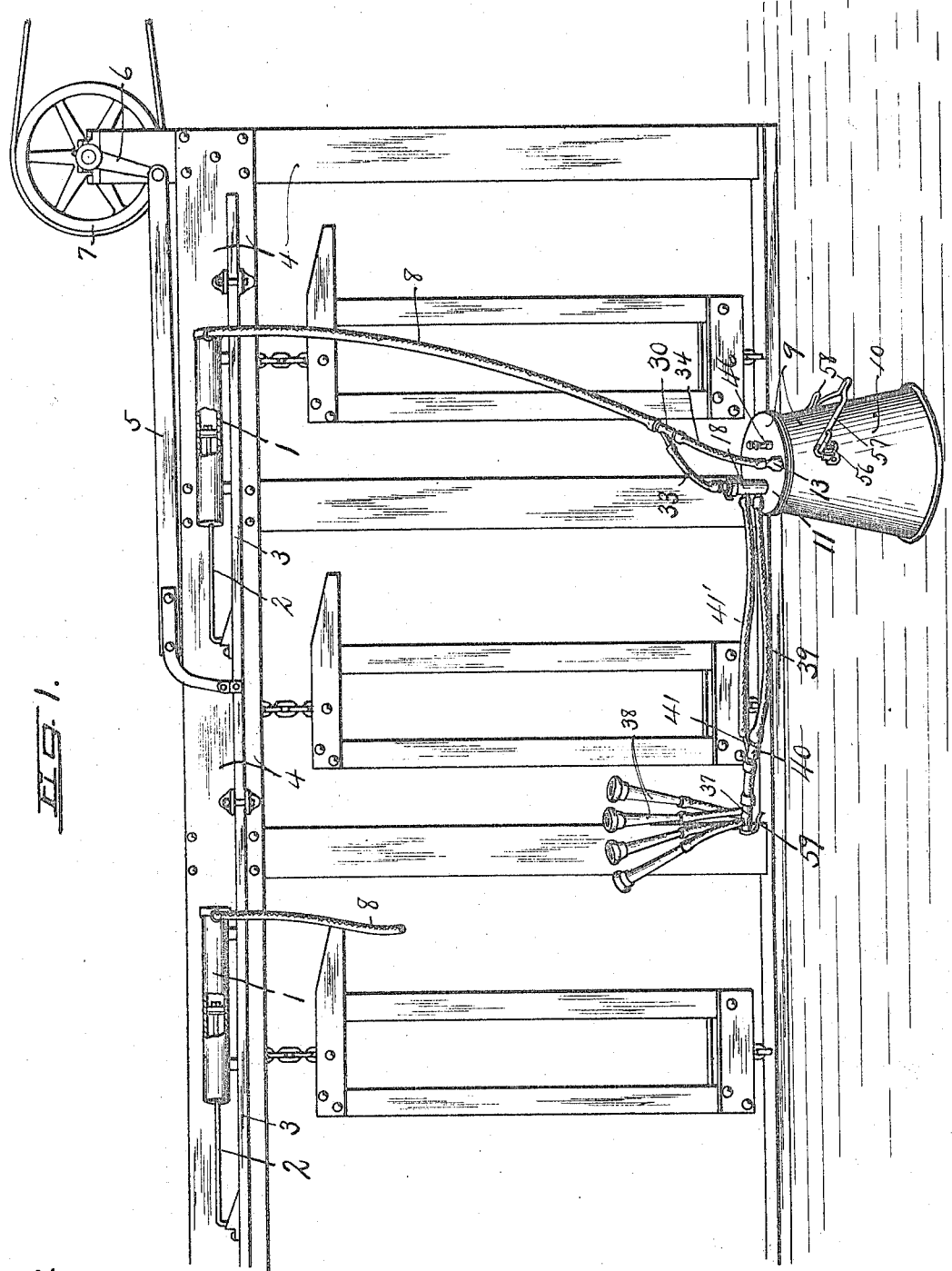
WITNESSES:
INVENTOR.
Arthur V. Hinman
BY
Howard P. Denison
ATTORNEY.

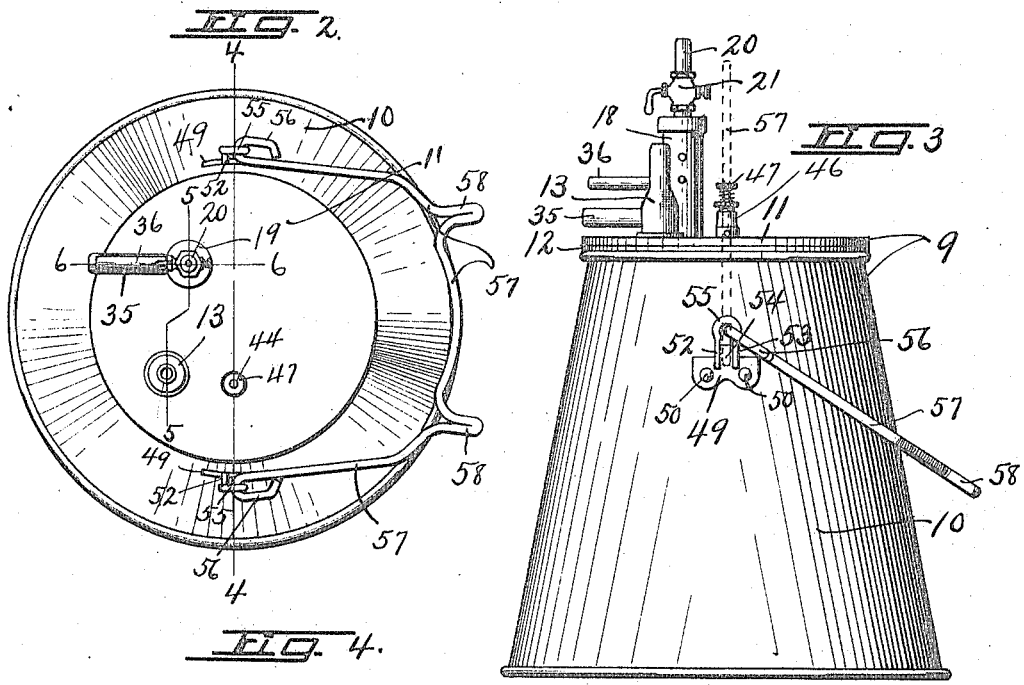
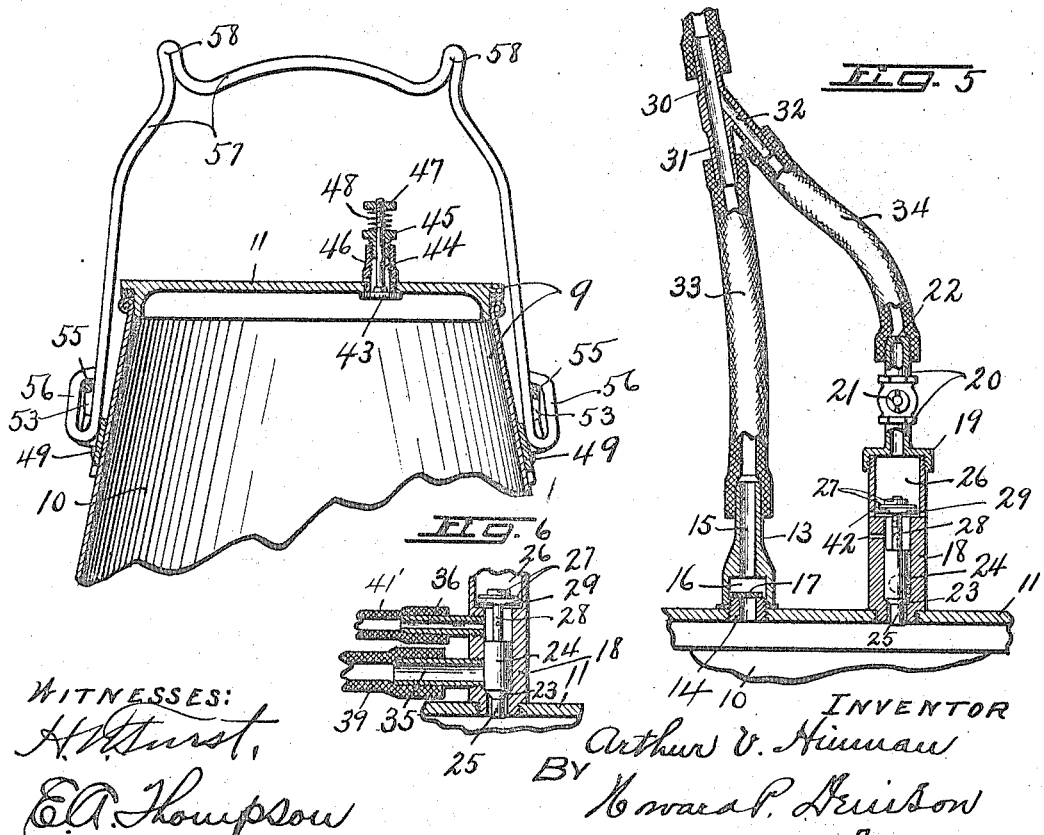

UNITED STATES PATENT OFFICE.

ARTHUR V. HINMAN, OF ONEIDA, NEW YORK, ASSIGNOR TO HINMAN MILKING MACHINE COMPANY, OF ONEIDA, NEW YORK, A CORPORATION OF NEW YORK.

MILKING-MACHINE.

1,233,668.  Specification of Letters Patent.  Patented July 17, 1917.

Application filed April 16, 1915. Serial No. 21,724.

*To all whom it may concern:*

Be it known that I, ARTHUR V. HINMAN, a citizen of the United States, and resident of Oneida, in the county of Madison, in the State of New York, have invented new and useful Improvements in Milking-Machines, of which the following, taken in connection with the accompanying drawings, is a full, clear, and exact description.

This invention relates to certain improvements in cow milking machines of the " vacuum in the pail " type.

The primary object of the invention is to provide means for milking a number of cows simultaneously and to adapt and utilize in connection with the above identified type of machine, a small diameter, long stroke piston pump for producing vacuum, in combination with a device preferably associated with the pail and peculiarly adapted for utilizing the mode of operation of such pump to produce pulsations in the teat cups and their connections.

A specific object is to utilize the vacuum produced by the operation of said pump not only to produce vacuum in the pail, but through a divided connection to operate the pulsating device to allow communication between the teat cups and their connections and the pail.

Another specific object is to provide means for admitting air to the teat cup connections for relieving the vacuum during each return stroke of the pump piston.

A further object relates to the provision of a swinging bail in combination with means for holding the same in vertical upright position, such means operating in connection with the gravity of the bail when in vertical position to lock the same so as to form a support for the teat cups, and released by the gravity of the pail when the same is raised by the bail.

Other objects and uses relate to the details of construction, arrangement and operation as will more fully appear from the following description, taken in connection with the accompanying drawings, in which—

Figure 1 is a perspective view of the machine assembled for operation.

Fig. 2 is a top plan view of the pail and cover.

Fig. 3 is a side elevation of the same.

Fig. 4 is a side elevation, partly in section, showing the relief valve and locking mechanism for the bail.

Fig. 5 is an elevation, partly in section, of a portion of the cover, the exhaust connection and the pulsating mechanism.

Fig. 6 is a vertical section of the pulsating mechanism, taken at substantially right angles to Fig. 5.

In order that my invention may be clearly understood, I have shown a complete device as assembled for operation upon and in connection with the usual stanchion, the numeral —1— representing a piston pump of relatively small diameter and long stroke, having its piston rod —2— suitably connected to a reciprocating bar —3— mounted upon the stanchion frames —4—, said bar reciprocated by any suitable and well known mechanism, as the rod —5—, crank —6— and pulley —7—.

Each pump, the number of pumps preferably equaling the number of milking units, is suitably and operably connected, preferably by flexible tubing —8—, to a vacuum pail —9—, and in the particular construction shown the pail —9— comprises a body portion —10— and a removable cover —11— adapted to have an air-tight fit, as, for instance, in the construction shown by the interposition of a resilient washer —12—.

The cover —11— is provided with a suitable nipple —13— having a threaded relation with an externally threaded sleeve —14— having a threaded relation with the milk pail cover.

The nipple is provided with a tubular passage —15— enlarged adjacent the bushing —14— to form a valve chamber —16— in which a valve —17— is movable, the chamber —16— being of somewhat greater diameter than the valve —17— and the edge of the valve is preferably fluted or corrugated to allow the passage of air when the valve is raised from contact with the bushing —14— by the exhaust of air from the nipple, as hereinafter described.

The pail cover —11— is likewise provided with a pulsation producing device comprising a cylindrical member —18— externally threaded at both ends, one end for threaded relation with an internally threaded portion of the pail cover and the other for the reception of an internally threaded cap —19— having an upwardly projecting nipple —20— including a shut-off or valve —21—, such nipple provided at its upper end with a relatively small opening —22— for a purpose hereinafter described.

The member —18— is formed with a tubular interior chamber of smallest diameter at the point of opening into the pail —9— and enlarged adjacent the opening to form a conical valve seat —23— for coaction with a valve —24— closing downwardly and having a cylindrical end portion —25— projecting downwardly to partially close the end of the tubular chamber. The upper portion of the tubular chamber is enlarged to form a piston chamber —26— in which a piston —27—, mounted upon the stem —28— of the valve —24, is movable.

The piston preferably includes a flexible suction disk —29— adapted to have airtight contact with the walls of the chamber —26—. The valve stem —28— is of considerably less diameter than the valve —24— for a purpose hereinafter described. The flexible tubing —8— is provided with a union —30— comprising two connections —31— and —32— for flexible tubing —33— and —34—, the tubing —33— having an air-tight connection with the nozzle —13— and the tubing —34— having a similar connection with the nipple —20—.

The tubular member —18— is provided, as shown, with a pair of laterally extending nipples —35— and —36—, the nipple —35— connected to the claw —37— carrying the teat cups —38— by flexible tubing —39— and union —40—, said union having a bypass —41— connected by flexible tubing 41' to the nipple —36—.

It will be noted that when valve —24— is closed against the conical seat —23— the cylindrical portion of the valve likewise closes the opening from the nipple —35— into the tubular member —18—. The valve stem —28— being of considerably less diameter than the cylindrical valve —24—, allows communication between the nipple —36— and the interior of the tubular member —18— and through the opening —42— with the atmosphere.

When the piston —27— is raised, by the method hereinafter described, the valve —24— is raised gradually to such an extent that free communication exists between the nipple —35— and the interior of the pail —9—, the rear portion of the valve —24— at the same time shutting off communication between the nipple —36— and the interior of the tubular member —18—.

The pail cover is provided with a suitable relief valve —43— having its stem —44— passed through a cap —45— adjustable in a sleeve —46— having a threaded relation with an interiorly threaded portion of the cover —11—. The end of the valve stem —44— is provided with an adjustable nut —47— for tensioning the spring —48— positioned between the cap —45— and the nut —47— for holding the valve —43— in closed position. The extent of the vacuum in the pail is thus regulated by the adjustment of the parts —45— and —47— and is automatically kept at the maximum adjusted amount.

The body —10— of the pail is provided with suitable ears for supporting a pail bail, each ear comprising a base plate —49— secured to the pail in any suitable manner, as by rivets —50—, and provided with a pair of spaced laterally projecting flanges —52— and —53— having a connecting bottom portion —54— adapted to space the bail, as hereinafter described, from the wall of the pail —9—. The outer upper edges of the flanges —52— and —53— are extended upwardly and connected to form a loop —55—, each loop adapted to receive an eye —56— formed upon the ends of a suitable bail —57— having upwardly extending projections —58— adapted to receive and support the teat cups —38— when the bail is locked in vertical position, in the manner presently described, and the claw —37— may be provided with a hook —59— for this purpose.

Preferably, the bail is formed of a single piece of wire having the eyes —56— formed in opposite ends thereof and its intermediate portion return bent to form the projecting portions —58—. The eyes —56— are considerably elongated so that when the bail is raised to vertical position, the bail will automatically drop by gravity, so that the lower portion bordering the eye will drop between the flanges —52— and —53—, thereby locking the bail from swinging movement.

When the bail is raised, the lower portion of the eye is drawn from between the flanges —52— and —53— and may be swung to either side in the usual manner.

The bail is thus adapted to be swung from one side to the other, in the usual manner, and when in vertical position is automatically locked in that position and provides a support for the teat cups preventing their dragging upon the ground or from contacting therewith. When the teat cups are in use, the bail is swung from its vertical position and in no way interferes with or prevents the efficient operation and use of the pail or the removal of the cover.

The operation of the device is as follows: The pulley —7— is driven, through any suitable means, for operating the pumps —1—, one pump for each vacuum pail; the valve —21— is closed to shut off communication between the tubing —8— and the pulsating mechanism, so that the first stroke or two of the pump transfers the vacuum entirely to the pail, the valve —24— remaining closed. When the vacuum reaches the desired amount or approximately that, as may be determined from the operation of the relief valve —43—, the valve —21— is opened and the vacuum produced by the pump communicating through the minute opening —22— with the piston chamber —26— gradually draws the piston —27— upwardly to allow communication between the nipple —35— and thereby the teat cups —38— and the pail —9—. At the same time, the valve —24— closes the communication with the nipple —36—.

The smallness of the opening —22— prevents the sudden application of the exhaust of air to the piston —27— and renders the application, and thereby the movement of the piston, slow and gradual, so that the vacuum is not applied suddenly with complete force to the teat cups —38—.

The cylindrical projection —25— lying in the tubular passage in the member —18— likewise renders the application of the vacuum in the pail to the teat cups —38— slow and gradual, by reason of the relatively small passage allowed for the air. Milk is drawn into the chamber during the remainder of the outstroke of the piston after communication is established between the pail —9— and the nipple —35—. Upon the return stroke of the piston, the valve —24— closes against its seat —23— and, as it closes, opens the communication between the nipple —36— and the interior of the member —18— and thereby the atmosphere through the opening —42— and the air admitted therethrough neutralizes the vacuum in the teat cups —38—. Upon the outstroke of the piston the operation is repeated, the valve —24— being raised to close communication between nipple —36— and the interior of member —18—, thereby cutting off communication between the teat cups and the atmosphere through port —42—. The air which had previously been admitted to tubing —41'— to neutralize the vacuum in the teat cups is then drawn through hose —39— into the pail —10— to be exhausted by the pump through nipple —15— and tubing —33—.

The admission of air to the teat cups to neutralize or partially neutralize the vacuum therein is essential to the milking operation, due to the fact that the pulsations are produced by the creation of vacuum and then the neutralization or partial neutralization of same, producing an effect upon the teats of the animal similar to the effect produced by the opening and closing of the hand in manual milking. After the piston —27— is moved to the limit of its upward stroke in the chamber —26—, the remainder of the vacuum is entirely communicated to the pail —9—. Any one or more of the pumps —1— may be detached without affecting the other machines at work at the same time. When the teat cups are not being used, the bail may be swung upwardly and is automatically locked in that position for supporting the cups.

Although I have shown and described one particular construction, arrangement and method of operation, I do not desire to limit myself to any construction, method of operation or arrangement, as many changes may be made in the details of the same without departing from the spirit of this invention as set forth in the appended claims.

What I claim is:—

1. In a milking machine, a power-driven individual vacuum pump, a vacuum pail connected to be exhausted thereby, teat cups, and means for producing pulsations in the cups by the movement of the pump piston, whereby the milk is drawn from the cow into the pail.

2. In a milking machine, a plurality of individual pumps, power-driven means for operating said pumps in unison, a plurality of vacuum pails connected to be exhausted by respective pumps, a set of teat cups connected to each pail for the passage of milk to its respective pail, and means for producing pulsations in the teat cups of each set by the movement of the pump pistons of their respective pumps.

3. In a milking machine, an individual vacuum pump, a vacuum pail, means of communication between the pump and pail, a pulsating mechanism, teat cups operably connected for the passage of milk through the pulsating mechanism to the pail, means of communication between the pump and the pulsating mechanism, whereby the operation of the pump operates said mechanism to bring the teat cups in direct communication with the pail.

4. In a milking machine, a vacuum pump, a vacuum pail, a pulsating device, teat cups operably connected for the passage of milk through the pulsating mechanism to the pail, means of communication between the pump and the pail, means of communication between the pump and the pulsating device, whereby the vacuum producing stroke of the pump piston operates said mechanism to bring the teat cups in direct communication with the pail and the return stroke of said piston shuts off communication between the teat cups and the pail.

5. In a milking machine, an air exhaust pump, a vacuum pail, a pulsation producing device in connection with the pail, teat cups operably connected for the passage of milk through the pulsating mechanism to the pail, means of direct communication between the pump and the pail, means of direct communication between the pump and the pulsation producing device, whereby, upon the exhaust stroke of the pump piston, the pulsation producing device is operated to bring the teat cups into communication with the pail, said pulsation producing device including means for neutralizing the vacuum in the teat cups upon the return stroke of the pump piston.

6. In a milking machine, an individual vacuum pump, a vacuum pail, teat cups, pulsation producing mechanism adapted to bring the pail in direct communication with the teat cups upon the outstroke of the pump piston and to shut off such communication upon the return stroke and admit air to the teat cups to neutralize the vacuum.

7. In a milking machine, a vacuum pump, a vacuum pail, teat cups operably connected to the pail for the passage of fluid, a pulsation producing device in said connection with the pail, means of communication between the pump and the pulsation producing device, said device including a piston actuated by the vacuum produced by the pump to bring the pail in direct communication with the teat cups.

8. In a milking machine, a vacuum pail including a removable cover, a vacuum pump in communication with the pail, a valve chamber mounted on the pail cover and having an opening at its bottom adapted to discharge through the pail cover, teat cups, means of communication between the valve chamber and the teat cups, a valve in said chamber controlling communication between the teat cups and said discharge opening, means of communication between the pump and the valve chamber whereby the teat cups and pail are brought into direct communication upon the vacuum producing stroke of said pump piston.

9. In a milking machine, a vacuum pail including a removable cover, a vacuum pump in communication with the pail, a valve chamber mounted on the pail cover and having an opening at its bottom adapted to discharge through the pail cover, teat cups, means of communication between the valve chamber and the teat cups, a valve in said chamber controlling communication between the teat cups and said discharge opening, a piston chamber, a piston in said chamber and operably connected to said valve, and means of communication between the piston chamber and the pump.

10. In a milking machine, a vacuum pail including a removable cover, a vacuum pump in communication with the pail, a valve chamber mounted on the pail cover and having an opening at its bottom adapted to discharge through the pail cover, teat cups, means of communication between the valve chamber and the teat cups, a valve in said chamber controlling communication between the teat cups and said discharge opening, a piston chamber, a piston in said chamber and operably connected to said valve, means of communication between the piston chamber and the pump, and means allowing communication of the teat cups with the atmosphere when said valve shuts off communication between the teat cups and the pail.

11. The combination with a pail, of a bail loosely secured to the pail to permit relative movement of the pail and bail in a direction longitudinally of the pail, and locking means for holding the bail in upright condition at a predetermined position of relative movement.

12. The combination with a pail, of a bail loosely secured thereto to permit relative movement of the pail and bail in a direction longitudinally of the pail, locking means for holding the bail in upright condition at a predetermined position of relative movement, the bail adapted to be moved to locking position by the gravity of the bail.

13. The combination with a pail having ears provided with loops and channels, of a bail having a pair of elongated eyes engaged respectively with the loops and slidable vertically in said channels to lock the bail in upright position.

14. In combination with a pail, a swinging bail loosely secured to the pail upon opposite sides thereof to permit relative movement of the pail and bail longitudinally of the pail, channels upon opposite sides of the pail adapted to receive respective ends of the bail when the bail is moved vertically downwardly relatively to the pail.

15. In a milking machine, a vacuum pump, a vacuum pail, a pulsating device, teat cups operably connected therethrough for the passage of milk to the pail, means of communication between the pump and the pail, means of communication between the pump and the pulsating device whereby the operation of the pump operates said mechanism to bring the teat cups in direct communication with the pail, and means for preventing the abrupt transference of the vacuum in the pail to the teat cups.

16. In a milking machine, a vacuum pump, a vacuum pail, a pulsating device, teat cups operably connected therethrough for the passage of milk to the pail, means of communication between the pump and the pail, means of communication between the pump and the pulsating device whereby the vacuum produced by the pump operates said mechanism to bring the teat cups in direct communication with the pail, the communication between the pump and the pulsating device being of such a character as to prevent the abrupt operation of said device.

17. In a milking machine, a vacuum pail, a milk inlet thereto, a valve controlling said inlet, teat cups operably connected to said inlet for the passage of milk to the pail, means for exhausting the air from the pail, means movable in said inlet and operated by said valve for preventing abrupt transference of the vacuum in the pail to the teat cups, and means for operating the valve.

18. In a milking machine, a vacuum pump, a vacuum pail operably connected thereto, teat cups operably connected for the passage of milk to the pail, said connections including a valve casing, a valve in said casing, means of communication between the pump and the valve chamber whereby the vacuum operates said valve to allow direct communication of the teat cups and the pail, and means allowing communication between the teat cups and the atmosphere when said valve closes the communication between the teat cups and the pail.

19. In a milking machine, a vacuum pump, a vacuum pail operably connected to the pump, teat cups communicating with the pail for the passage of milk, means for normally closing the communication between the teat cups and the pail, and means for allowing communication between the teat cups and the atmosphere when such communication is closed.

20. In a milking machine, an air exhaust pump, a vacuum pail, a pulsation producing device in connection with the pail, teat cups operably connected for the passage of milk to the pail, means of direct communication between the pump and the pail, means of direct communication between the pump and the pulsation producing device, whereby, upon the exhaust stroke of the pump piston, the pulsation producing device is operated to bring the teat cups into communication with the pail, said pulsation producing device including means independent of the communication between the pail and pump for neutralizing the vacuum in the teat cups upon the return stroke of the pump piston.

21. In a milking machine, a vacuum pail, teat cups, an air inlet to the teat cups, means of communication between the teat cups and the pail, a vacuum pump, means of communication between the pump and pail, a valve controlling communication between the teat cups and the pail, means for operating said valve to open communication between the teat cups and pail and simultaneously cut off communication between the teat cups and the air inlet.

22. In a milking machine, a vacuum pail, teat cups, an air inlet to the teat cups, means of communication between the teat cups and pail, a valve in such communication, a vacuum pump, means of communication between the pump and pail, said valve closing communication between the teat cups and the air inlet when operated to permit communication between the teat cups and the pail.

23. In a milking machine, a vacuum pump, a vacuum pail connected to be exhausted thereby, a pulsation device, teat cups operably connected for the passage of milk through the pulsation device to the pail, and a restricted means of communication between the pump and the pulsation device.

In witness whereof I have hereunto set my hand this 8th day of April, 1915.

ARTHUR V. HINMAN.

Witnesses:
EDWIN E. BROWN,
RALPH H. WOOLVER.